US008215335B2

(12) United States Patent
Barnham

(10) Patent No.: US 8,215,335 B2
(45) Date of Patent: Jul. 10, 2012

(54) AUTOMATIC FLUID FLOW CONTROL DEVICE

(76) Inventor: James Wesley Barnham, London (GB)

( * ) Notice: Subject to any disclaimer, the term of this patent is extended or adjusted under 35 U.S.C. 154(b) by 0 days.

(21) Appl. No.: 12/860,897

(22) Filed: Aug. 22, 2010

(65) Prior Publication Data

US 2010/0314565 A1  Dec. 16, 2010

Related U.S. Application Data

(63) Continuation of application No. 11/996,144, filed as application No. PCT/GB2006/002748 on Jul. 24, 2006, now abandoned.

(30) Foreign Application Priority Data

Jul. 22, 2005 (GB) .................................. 0515067.7

(51) Int. Cl.
*F16K 31/18* (2006.01)
(52) U.S. Cl. ............. 137/448; 137/411; 137/909; 4/669
(58) Field of Classification Search .................. 137/909, 137/668, 669, 386, 448, 409–411, 423–425, 137/192, 195, 413, 414, 428; 251/65; 4/668, 4/669
See application file for complete search history.

(56) References Cited

U.S. PATENT DOCUMENTS

| RE18,520 | E | * | 7/1932 | Mock | 137/432 |
| 2,752,936 | A | * | 7/1956 | Cantalupo | 137/414 |
| 2,756,766 | A | * | 7/1956 | Tronic | 137/397 |
| 2,871,873 | A | * | 2/1959 | Mcqueen | 137/413 |
| 2,999,509 | A | * | 9/1961 | Hankison et al. | 137/195 |
| 3,029,786 | A | * | 4/1962 | Gillette et al. | 251/65 |
| 3,105,512 | A | * | 10/1963 | Lyall et al. | 137/416 |
| 3,212,751 | A | * | 10/1965 | Hassa | 251/65 |
| 3,609,425 | A | * | 9/1971 | Sheridan | 251/65 |
| 3,891,000 | A | * | 6/1975 | Melnick | 251/65 |
| 3,905,391 | A | * | 9/1975 | Oakes | 251/65 |

(Continued)

FOREIGN PATENT DOCUMENTS

| CN | 2618011 Y | 5/2004 |
| DE | 2258634 A1 | 6/1972 |
| GB | 2 288 330 A | 10/1995 |
| GB | 2 373 859 A | 10/2002 |

(Continued)

OTHER PUBLICATIONS

English (machine) translation of CN2618011Y.

(Continued)

*Primary Examiner* — Craig Scheider
*Assistant Examiner* — Craig J Price
(74) *Attorney, Agent, or Firm* — Modern Times Legal

(57) ABSTRACT

A fluid control device for a fluid supply includes a housing (31) defining a fluid supply channel (34) with a fluid inlet (35) for coupling to a fluid supply and a fluid outlet (36) for coupling to an appliance. The housing additionally defines a chamber (44) with an inlet (40) for coupling to an overflow and an outlet (41) for coupling to a drain. A valve (55) is located in the fluid supply channel (34) and is moveable from a first open position to a second closed position where fluid flow through the channel (34) is substantially restricted. An actuator (52) is provided in the chamber (44) and is moveable from a first position to a second position. The valve (55) and actuator (44) are magnetically coupled to one another such that movement of the actuator (44) from the first position to the second position causes the valve (55) to move from the open position to the closed position.

9 Claims, 14 Drawing Sheets

U.S. PATENT DOCUMENTS

| | | | | |
|---|---|---|---|---|
| 3,980,457 A * | 9/1976 | Smith | | 251/65 |
| 3,993,090 A * | 11/1976 | Hankison | | 137/195 |
| 4,079,743 A * | 3/1978 | Weston | | 137/192 |
| 4,531,544 A * | 7/1985 | Jacobs | | 454/369 |
| 4,574,829 A * | 3/1986 | Cummings et al. | | 137/195 |
| 4,577,657 A * | 3/1986 | Alexander | | 251/65 |
| 5,004,004 A * | 4/1991 | Cummings | | 137/195 |
| 5,080,126 A * | 1/1992 | De Rycke et al. | | 137/195 |
| 5,209,454 A * | 5/1993 | Engdahl et al. | | 251/65 |
| 5,485,866 A * | 1/1996 | Bowen | | 137/432 |
| 5,983,919 A * | 11/1999 | Ottinger et al. | | 137/195 |
| 6,089,258 A * | 7/2000 | Busick et al. | | 137/422 |
| 6,129,836 A | 10/2000 | Grayson | | 137/423 |
| 6,473,928 B1 * | 11/2002 | Veloskey et al. | | 137/909 |
| 6,732,388 B2 * | 5/2004 | McKenna | | 4/669 |
| 2004/0050424 A1 | 3/2004 | Sosa | | |

FOREIGN PATENT DOCUMENTS

| | | |
|---|---|---|
| GB | 2 380 796 A | 4/2003 |
| GB | 2 407 033 A | 4/2005 |
| GB | 2 416 119 A | 1/2006 |
| GB | 2 421 558 A | 6/2006 |
| GB | 2421558 A * | 6/2006 |
| WO | WO-00/12922 A1 | 3/2000 |
| WO | WO-02/092923 A1 | 11/2002 |

OTHER PUBLICATIONS

State Intellectual Property Office, Chinese Office Action for CN200680026838.1, mailed Dec. 4, 2009.

English Translation of Chinese Office Action for CN200680026838.1, mailed Dec. 4, 2009.

* cited by examiner

AUTOMATIC FLUID FLOW CONTROL DEVICE

RELATED APPLICATIONS

This application is a continuation of Ser. No. 11/996,144, which is a US national-stage filing of PCT Application No. GB06/02748, filed on Jul. 24, 2006, which claims priority to UK Patent Application No. GB0515067.7, filed on Jul. 22, 205, the entire teachings of each of which are incorporated herein by reference.

FIELD OF THE INVENTION

The present invention relates to automatic fluid flow control devices, particularly but not exclusively to automatic liquid flow control devices. Particularly preferred embodiments of the present invention relate to automatic fluid flow control devices that are configured to operate when an oversupply condition occurs, and in one particularly preferred embodiment the device is operable to substantially shut-off (i.e. at least severely restrict) fluid flow until the device is reset.

Presently preferred embodiments of the present invention, and indeed the problems addressed by the present invention, are described hereafter with particular reference to domestic water-supply applications, but it should be noted that the scope of the present invention is not limited to a particular fluid type nor is it limited to a particular application. As such the following description should only be interpreted as being illustrative and should not be interpreted as limiting the scope of the present invention.

The device to be described can, for example, be used in domestic, commercial and industrial applications for the control of a variety of different fluids, including both gases and liquids.

BACKGROUND TO THE INVENTION

It has previously been proposed to provide water tanks, such a toilet cistern or a cold-water tank, with a valve which is configured to operate to shut-off the supply of water when the level of the water in the tank reaches a predetermined point. For example, it is typical in domestic applications to provide a so-called ball valve which consists of a hollow ball-shaped float that is connected to a simple valve by a movable arm.

FIG. 1 is a schematic representation of a tank 101 showing the valve components in an empty position where the amount of fluid in the tank is reduced. The tank 101 has an inlet pipe 103, an outlet pipe 105, and an overflow pipe 107. Fluid flowing through the inlet enters a valve assembly 109 that is provided (in this instance) with a flap valve 111 that is pivotally movable between an open position (as illustrated in FIG. 1) where fluid flows through the valve and out of a valve assembly outlet 113 and into the tank 101, and a closed position where fluid flow is arrested (as illustrated in FIG. 2) once a predetermined maximum water level 121 (see FIG. 2) has been reached. The flap valve 111 is coupled to a float arm 115 that has a float 117 mounted on one end, and the float arm 115 is pivotally moveable about a pivot point 119 to move the flap between the open and closed positions.

FIG. 2 is a schematic representation of the tank 101 showing the valve components in a position where the fluid in the tank is at the predetermined maximum level 121 and the float 117 has moved the float arm 115 to close the valve 111. As will be appreciated, the float 117 floats on the water in the tank 101, and as the water level and float 117 rises the arm 115 moves to close the flap valve 111 on the water inlet valve assembly 109 to shut off the supply of water to the tank. In the event of a valve failure or a failure of the float to rise with the water level, continual water supply to the tank will cause the water level in the tank to rise to a level 123 above the predetermined maximum level 121 where an "oversupply condition" is said to have occurred, and at that point the intention is that excess water should safely drain from the tank via the overflow pipe 107.

Whilst such systems have operated adequately for many years, the advent of an oversupply condition where water is being drained from the overflow pipe 107 can cause significant amounts of water to be lost and in times where water is a limited resource such escapes should be avoided or reduced wherever possible.

It is also the case that if the valve 111 or valve assembly 109 should deteriorate to a point where the volume of liquid being supplied per unit time from the inlet 103 is greater than the volume of liquid escaping via the overflow pipe 107 per unit time (or indeed if the float should fail to rise with the water level), then the tank can fill beyond its intended maximum level 121, beyond the oversupply level 123 where excess water flows down the overflow pipe, and an overflow of water over the sides of the tank 101 can occur.

In the case of appliances (such as sinks, baths, basins, bidets and the like) there are usually no shut-off devices provided. Overflow pipes are, however, usually provided and such pipes are typically linked to the drains (often via a waste pipe through which waste water normally flows) so that once the water level in the appliance has risen beyond the predetermined maximum level, additional water can escape from the appliance via the overflow pipe and a spill of water flowing over the sides of the appliance can be avoided.

However, a significant problem with these appliances is that it is often the case that the appliances are configured so that a greater water volume can be supplied per unit time than the overflow pipes can remove. In such circumstances, these appliances are reliant on the user noticing that the water level has risen beyond the maximum point and taking appropriate corrective action (e.g. by turning off the taps of the appliance) to avoid overflow of water from the appliance. If the user is distracted or is not present, then the level of water in the appliance can continue to rise until it spills out of the appliance and damage can occur.

It is possible to conceive of an electronic valve and detector system which would act to shut-off the supply of water in the event of an oversupply of water being detected, but such a system would require a supply of electricity, either from batteries or the mains, to operate. Batteries degrade over time, and as such a system that utilised a battery power source would need careful monitoring to ensure that the device has sufficient power to operate properly. Connecting such a device to mains power would require that mains power is in close proximity to the water supply, and the dangers associated with electricity and water are such that such an arrangement would best be avoided—particularly as such valve and detector systems may well be retrofitted by persons unskilled in electrical installations. It is also the case that an electrical supply may not always be available close to the appliance to which the device is to be fitted.

It would be highly advantageous, therefore, if device could be devised which did not require electricity to operate to shut-off or at least substantially restrict fluid flow in the event of an oversupply being detected.

One previously proposed attempt to provide such a device is disclosed in GB Patent Publication No. 2288330. This device includes a cold water inlet, a hot water inlet, an overflow inlet, and an overflow outlet. The cold water inlet is connected to the cold water supply and to the cold water tap of the appliance. In a similar fashion, the hot water inlet is connected to the hot water supply and to the hot water tap of the appliance. The overflow pipe of the appliance is coupled to the overflow inlet, and the overflow outlet is coupled to the drains.

The device includes a chamber into which water from the overflow inlet can flow. A float is provided within a float guide in the chamber and is connected to a pair of cantilevered actuator arms which project into the hot and cold inlets via respective access holes cut in the hot and cold inlet walls. The overflow outlet includes a bleed hole to allow liquid in the chamber to run into the drain.

When the level of water in the appliance exceeds the predetermined maximum level, the water runs into the appliance overflow pipe and via the pipe into the chamber. As water enters the chamber the water level in the chamber rises and the float moves to an elevated position. As the float moves higher the cantilevered arms in each of the hot and cold inlets progressively move to obstruct the flow of water until the flow is cut-off when the float is generally at the level of the overflow outlet.

At this position, water flow into the appliance has been prevented, and as such it is no longer possible for the appliance to overflow. However, as soon as the water in the chamber begins to bleed into the outlet waste, the water level in the chamber will reduce, the float will drop and the hot and cold water inlets will open once more until the level of water in the chamber is replenished by water flowing into the chamber via the overflow inlet.

It is apparent, therefore, that whilst this device would achieve the primary aim of preventing overflows, it necessarily cycles between open and closed valve positions, and as such it inherently wastes significant amounts of water. It is also possible, if that cycling occurs relatively quickly, for the device to cause water hammer in the pipework by generating pressure pulses in the hot and cold water inlets.

An aim of the present invention is to provide a flow-control device which reduces the chance of an overflow occurring, whilst also avoiding the problems associated with prior devices of the type disclosed in the abovementioned GB patent application.

STATEMENT OF THE INVENTION

To this end, a presently preferred embodiment of the present invention provides an automatic fluid flow control device for a fluid supply, wherein the device is operable without an electrical supply, and comprises an actuator movable from a first position corresponding to a normal fluid supply to a second position corresponding to a fluid oversupply, the actuator acting on a valve in said fluid supply as it moves from said first to said second position to close said valve and thereby at least substantially restrict the flow of fluid in said fluid supply until the device is reset.

Another aspect of the present invention relates to a fluid flow control device that is automatically operable, without an electrical supply and in the event of an oversupply of fluid, to substantially restrict the fluid flow until the device is reset.

In the preferred embodiment the actuator includes a magnet and is capable of directly or indirectly exerting a magnetic force on said valve.

Preferably the actuator and valve each include a magnet, the magnets interacting to exert a force on said valve that urges said valve closed as the actuator moves from said first position to said second position.

Preferably, the actuator and valve each include a magnet, the magnets interacting to exert a force on said valve that urges said valve open as the actuator moves from said second position to said first position.

The magnets may be arranged in said first position with different magnetic poles adjacent, and in said second position with like magnetic poles adjacent.

In one embodiment the actuator comprises a float located in a chamber, the chamber comprising an inlet for connection to an overflow pipe and an outlet for connection to a drain, the arrangement being such that fluid can flow into said chamber via said overflow inlet to cause said float to move from said first position to said second position as the fluid level within the chamber increases.

Preferably the outlet is configured to be capable of passing a smaller volume of fluid per unit time than the inlet. The device may comprise a stopper for the outlet which stopper reduces the volume of liquid that can flow through said outlet per unit time. Preferably, the stopper is removable from the outlet. The stopper may include a plurality of cut-away wall portions to permit fluid flow therethrough.

Preferably, the float is pivotable between said first and second positions.

In a highly preferred arrangement, the actuator is capable of acting on a second valve in a second fluid supply as it moves from said first to said second position.

In another highly preferred arrangement, the device may comprise a second actuator that is capable of acting on a second valve in a second fluid supply to cause the valve to move from an open position to a closed position as the second actuator moves from a third position corresponding to said first position to a fourth position corresponding to said second position.

In another embodiment, the actuator may comprise a receptacle located in a chamber, the chamber comprising an inlet for connection to an overflow pipe and an outlet for connection to a drain, the arrangement being such that fluid can flow into said chamber via said overflow inlet and into said receptacle to cause said receptacle to move from said first position to said second position as the fluid level within the receptacle increases.

Preferably, the receptacle comprises a drain to permit fluid to drain therefrom, and from the chamber via said outlet.

The receptacle may be resiliently biased away from a wall of the chamber in said first position and movable against said bias to said second position. Preferably said receptacle is resiliently biased away from a floor of the chamber, the receptacle compressing said resilient bias as it moves from said first position to said second position. Preferably the receptacle has said magnet mounted to a wall thereof.

The receptacle may include a second magnet mounted to an opposing wall of the receptacle, the second magnet being capable of acting on a second valve in a second fluid supply to cause the valve to move from an open position to a closed position as the receptacle moves from said first position to said second position.

In another embodiment the actuator may comprise a bladed member mounted for rotation on an axle located in a chamber, the chamber comprising an inlet for connection to an overflow pipe and an outlet for connection to a drain, the arrangement being such that fluid can flow into said chamber via said overflow inlet and against said bladed member to cause said bladed member to rotate from said first position to said second position to close the valve.

A blade of said bladed member may include a magnet mounted proximate said axle and said valve. The bladed member may include a second magnet mounted proximate said axle and a second valve, rotation of said bladed member from said first position to said second position causing said second valve to move to a closed position.

In another embodiment of the invention, there is provided a fluid control device for a fluid supply, the device comprising: a housing defining a fluid supply channel with a fluid inlet for coupling to a fluid supply and a fluid outlet for coupling to an appliance, the housing additionally defining a chamber with an inlet for coupling to an overflow and an outlet for coupling to a drain; a valve located in said fluid supply channel and moveable from a first open position to a second closed position where fluid flow through the channel is substantially restricted; and an actuator provided in said chamber and moveable from a first position to a second position, wherein the valve and actuator are magnetically coupled to one another such that movement of the actuator from said first position to said second position causes the valve to move from said open position to said closed position.

In another embodiment, there is provided a fluid control device for a fluid supply, the device comprising: a housing defining first and second fluid supply channels each with a fluid inlet for coupling to a fluid supply and a fluid outlet for coupling to an appliance, the housing additionally defining a chamber with an inlet for coupling to an overflow and an outlet for coupling to a drain; first and second valves located in said first and second fluid supply channels, each said valve being moveable from a first open position to a second closed position where fluid flow through the channel is substantially restricted; a first actuator provided in said chamber and moveable from a first position to a second position, wherein the first valve and first actuator are magnetically coupled to one another such that movement of the first actuator from said first position to said second position causes the first valve to move from said open position to said closed position; and a second actuator provided in said chamber and moveable from a first position to a second position, wherein the second valve and second actuator are magnetically coupled to one another such that movement of the second actuator from said first position to said second position causes the second valve to move from said open position to said closed position.

Preferably the arrangement is such that said valve or valves remain in said second closed position until the device is reset.

In accordance with another aspect of the present invention there is provided a mechanically operated liquid cut-off device in which oversupply of a liquid acts on a float in a chamber to move a magnet from a position where magnetic attraction holds a valve in its open position to a position where magnetic repulsion moves the valve towards its closed position where it cuts off the supply of liquid.

In a preferred embodiment of the invention, the invention provides a liquid cut-off device which comprises (i) a float movably mounted in a chamber; (ii) a first magnet connected to the float and located outside the chamber; (iii) a second magnet connected to a valve or a valve operating means which valve, in its closed position, cuts off a supply of liquid in a conduit and (iv) a third magnet, the magnets being located and orientated so that, when the valve is in the open position the first magnet is located adjacent and between the second and third magnets, with the north pole of the first magnet located adjacent to the south poles of the second and third magnets or vice versa and, when a liquid enters the chamber the float moves causing the first magnet to move away from its location between the second and third magnets so the repelling force between the same poles of the second and third magnets causes the valve to move towards its closed position, in which closed position it cuts off the flow of liquid in the conduit.

In another embodiment of the invention there is provided a liquid cut-off device which comprises (i) a float movably mounted in a chamber; (ii) a first magnet connected to the float and located outside the chamber and (iii) a second magnet connected to a valve or a valve operating means which valve, in its closed position, cuts off a supply of liquid in a conduit so that, when the valve is in the open position the first magnet is located adjacent the second magnet, with the north pole of the first magnet located adjacent to the south pole of the second magnet or vice versa and, when a liquid enters the chamber the float moves causing the first magnet to move away from its location with a magnetic pole of the first magnet adjacent the opposite pole of the second magnet to a location where the magnetic pole of the first magnet is adjacent the same pole of the second magnet so the repelling force between the same poles of the first and second magnets causes the valve to move towards its closed position, in which closed position it cuts off the flow of liquid in the conduit.

Preferably the valve is a flap valve with the magnet attached to the flap section and, when the flap moves into the flow of liquid in the conduit, the flow of the liquid helps to move the valve to the closed position. In this position the pressure of the liquid supply holds the valve closed.

If there are two conduits supplying liquid e.g. a hot and cold water supply, there can be two valves, one for each conduit, and the third magnet can be connected to a second valve or valve operating means so the repelling force between the same poles of the second and third magnets causes both valves to move towards their closed positions.

In one embodiment of the invention there is a space between the end of the second and third magnets and the first magnet is moved by the float to a position where it repels the second magnet and third magnets and thus assists in the movement of the valve.

When a flap valve is closed there is preferably a collar in the conduit against which the valve is seated to seal off the flow of liquid in the conduit completely.

The float can be a conventional float made of a hollow plastics or a foam material.

The float can be connected to the first magnet by a rod mounted directly below the float.

When the overflow ceases the liquid drains away from the float chamber, the float returns to its original position, the first magnet returns to its original position, the pressure of liquid underneath each flap may hold it closed, this can be a more powerful force than the first magnet at this point. When the tap(s) are closed however, the pressure of liquid stabilizes above and below the flap(s) which leaves each flap in a state of equilibrium. At this point, both the attraction of the first magnet and gravity will cause each flap to drop into its reset position and then be re-attracted to the first magnet again. In the preferred arrangement a tiny amount of water movement past the valve is provided in order for the water to stabilize in pressure above and below when the tap or taps are turned off.

In other embodiments of the valve design, it may be more suitable for there to be a grommet/washer or similar to prevent any liquid movement past the valve flaps.

The use of magnets means the valves are held in their open position by a positive force and are impelled by a positive force towards their closed position. The magnets can be conventional permanent magnets and, as they can come into contact with water, they should be rust proof etc.

In an embodiment of the invention the first magnet can be rotated by the movement of the float so instead of opposite poles of the first and second magnets being adjacent and so holding the valve open, the same poles of the first and second magnets are adjacent so moving the valve towards its closed position.

The device is particularly useful for domestic appliances where there is a hot and cold supply but it can be used for any situation. As aforementioned, if there are more than two conduits there can be more than two valves.

Various other preferred embodiments, and features and advantages thereof, will become apparent from the detailed description provided below.

BRIEF DESCRIPTION OF THE DRAWINGS

Presently preferred embodiments of the present invention will now be described, by way of example only, with reference to the accompanying drawings in which;—

DETAILED DESCRIPTION OF PREFERRED EMBODIMENTS

Figure 1:
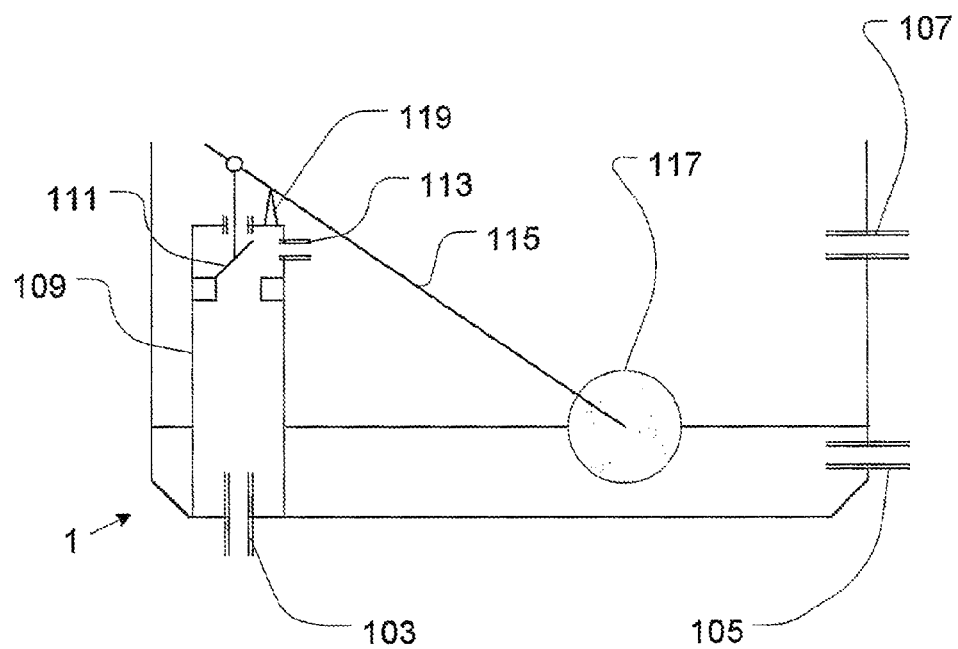
FIG. 1 is a schematic representation of a prior art water tank and ball valve in an empty configuration.
Figure 2:
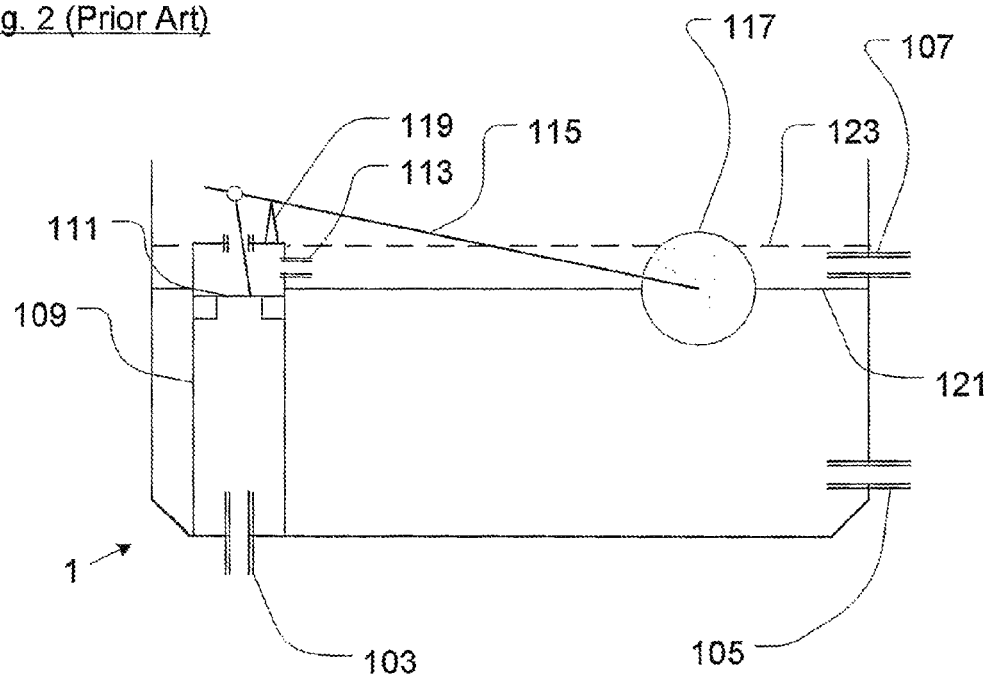
FIG. 2 is a schematic representation of the prior art water tank and ball valve of FIG. 1 in a configuration where fluid in the tank is at a predetermined maximum level.
Figure 3:
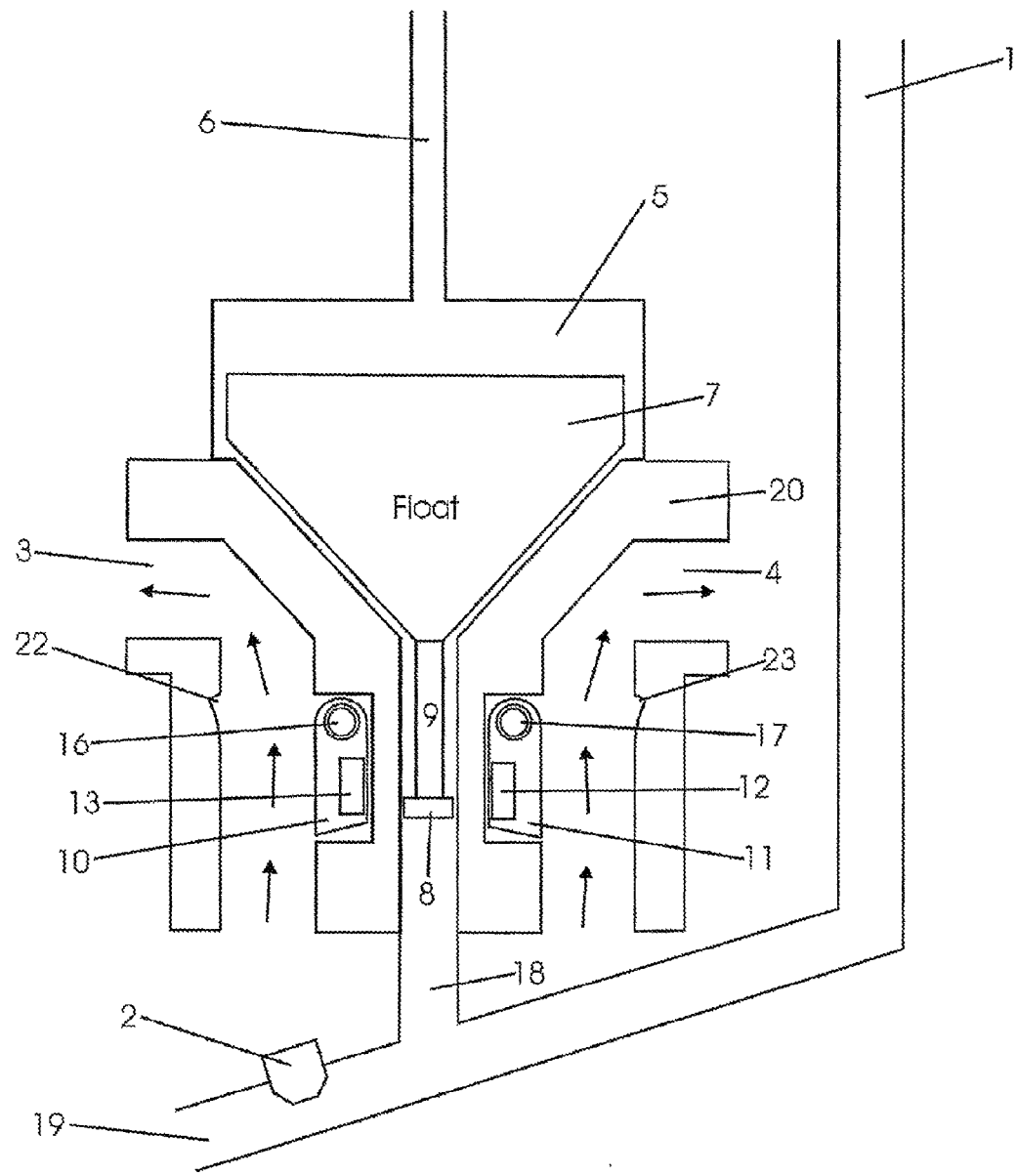
FIG. 3 is a schematic cross-sectional view of a control device according to a first embodiment of the present invention in a configuration corresponding to a normal supply.
Figure 4:
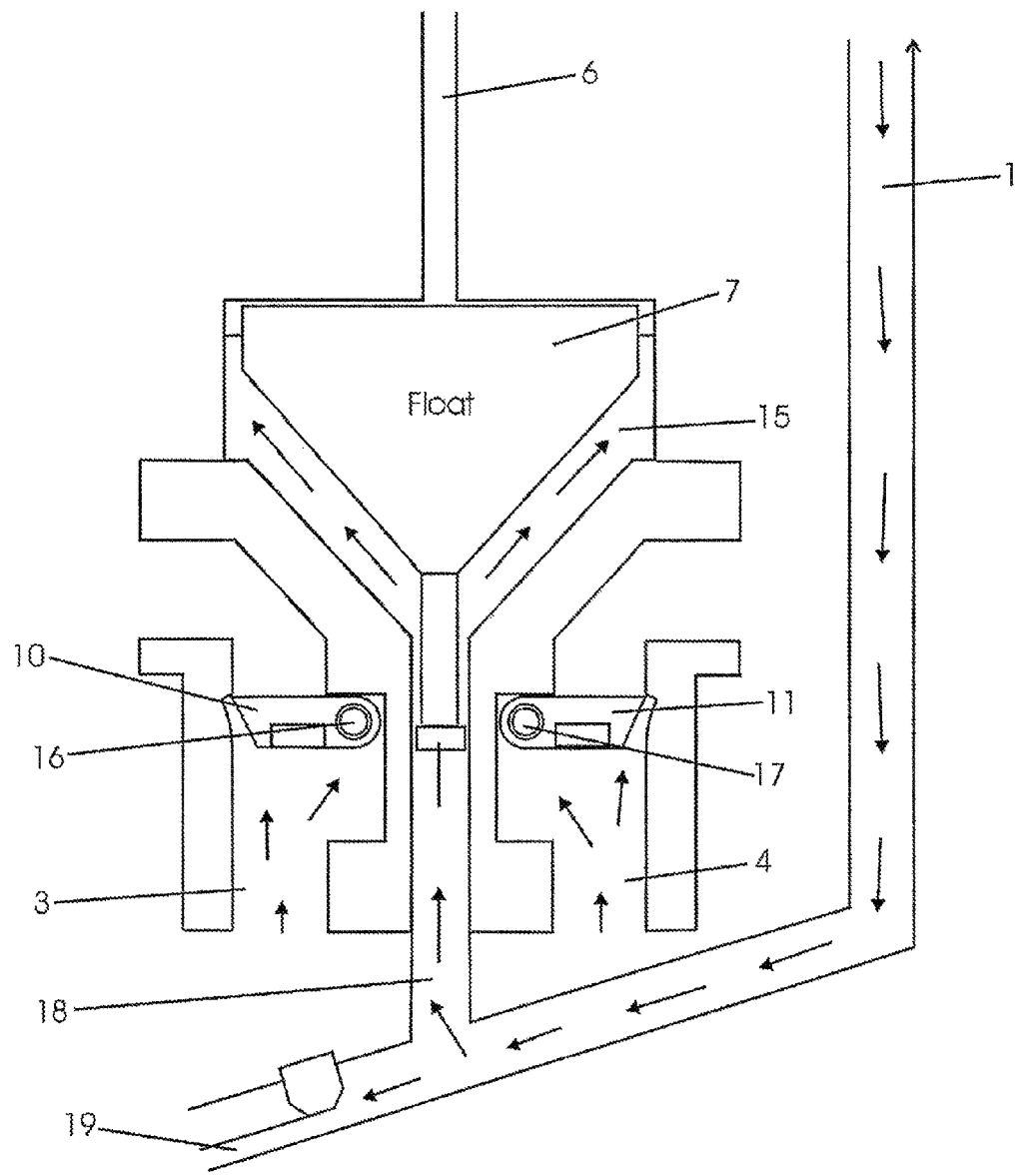
FIG. 4 is a schematic cross-sectional view of a control device of FIG. 3 is a configuration corresponding to a fluid oversupply.

Referring to FIGS. 3 and 4 there is shown a control device according to a first preferred embodiment of the present invention.

In this instance the device is configured for use with an appliance (such as a sink, bath, bidet or basin for example) that includes a pair of taps (not shown) that are fed respectively by a hot supply 3 and a cold supply 4. The appliance has an overflow pipe 1 which is coupled to a drain 19 that is provided with an adjustable flow resistor 2. The flow resistor 2 functions to adjust the volume of liquid flowing down the drain to thereby generate a back-pressure of sufficient magnitude to ensure that the device operates properly.

The control device includes a chamber 5 which is vented to atmosphere via an air vent 6, and which is coupled to the overflow 1 via a pipe 18. An actuator, in this instance a float 7, is provided within the chamber 5, and whilst fluid supply continues normally, the float rests on a seat 20. Two flap valves 10, 11 are provided, one mounted in each of the hot supply 3 and cold supply 4. The flap valves 10, 11 seal against collars 22, 23 and are pivotally moveable about respective axes 16, 17 to open or close the hot and cold supplies 3, 4.

Each flap valve is provided with a magnet 12, 13, and another magnet 8 is mounted on a rod 9 that is coupled to the float 7. The magnets are orientated, in a manner that is later described in connection with FIG. 4, to provide a magnetic force which positively urges the flap valves 10, 11 to open and closed positions.

Figure 5:
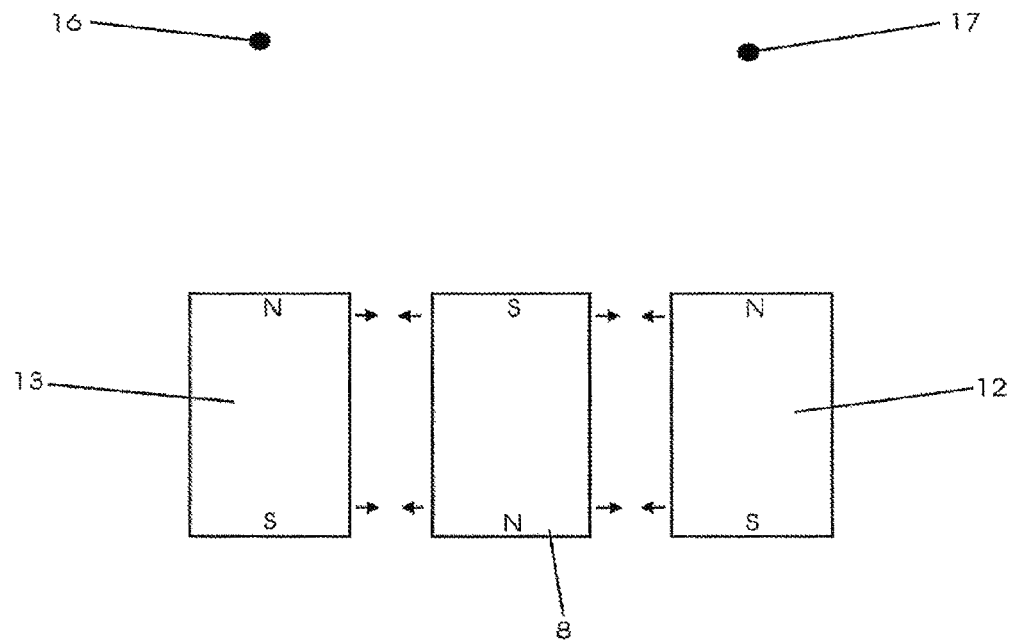
FIGS. 5 and 6 are details of FIGS. 3 and 4, respectively, illustrating a preferred magnet orientation in normal and fluid oversupply configurations.

In the arrangement depicted in FIG. 3, fluid supplied to the appliance has not yet reached the appliance overflow, and as such no oversupply condition has occurred. In this configuration, water can flow through the hot supply 3 and the cold supply 4, and the float is seated against its seat 20. When the float is in this position, the magnets are as shown in FIG. 5 with the north pole of the rod magnet 8 located between the south poles of valve magnets 12, 13 so that the valves 10 and 11 are held in the open position by virtue of magnetic attraction between the rod magnet 8 and valve magnets 12, 13. In an alternative configuration the magnets may be reversed so that the south pole of the rod magnet 8 lies between north poles of the valve magnets 12, 13.

When the level of fluid in the appliance reaches the appliance overflow, and oversupply condition occurs and fluid flows down the overflow pipe 1. As the fluid flows down the overflow pipe, the control device moves to the configuration depicted in FIG. 4. Specifically, fluid flows down the overflow pipe 1, up the pipe 18 and into the chamber 5 where it causes the float 7 to move from the position depicted in FIG. 3 towards the position depicted in FIG. 4, any displaced air being vented to atmosphere through the vent 6.

Figure 6:
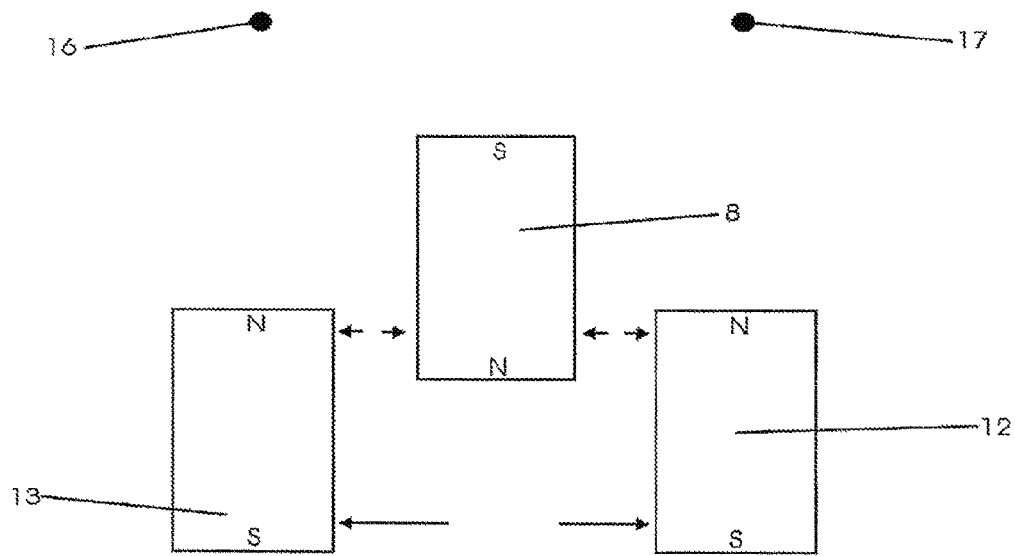

As the device moves towards the configuration depicted in FIG. 4 the magnet 8 moves towards the position depicted in FIG. 6 and the north pole of the pole magnet 8 moves towards the north poles of the valve magnets 12, 13. The repulsive forces between the north poles of the pole magnet 8 and valve magnets 12, 13, and the south poles of the valve magnets 12, 13, cause the flap valves 10, 11 to pivot about axes 16, 17 and move to a closed position illustrated in FIG. 4 where the supply of water through the hot and cold supplies 3, 4 is at least substantially shut-off. Advantageously, fluid flowing through the hot and cold supplies 3, 4 helps urge the flap valves 10, 11 to the closed position, and once in that closed position fluid pressure in the supplies holds the valves 10, 11 shut against respective sealing collars 22 and 23.

The valves may be configured to completely occlude the hot and cold supplies 3, 4 when they move to their closed positions illustrated in FIG. 4. However, whilst such an arrangement might be appropriate for some applications (such as the transport of flammable gases), in such an embodiment it would not be apparent to a user of an appliance fitted with the device (other than by the level of fluid in the appliance) that the device had operated, and as such it is preferred for this application that the valves still allow a small amount of fluid to pass so that the user immediately notices that the volume of fluid flowing into the appliance has been greatly reduced and hence that the control device has operated. In addition to providing a means for alerting the user, allowing a modicum of continued fluid flow past the closed valves also assists in resetting the device. In general terms, it is preferred that the device operates to reduce fluid flow by at least 70%, and more preferably by more than 80%.

Once the valves have operated to at least substantially shut-off fluid flow through the hot and cold supplies 3, 4, fluid held in the chamber 5 drains away down drain 19 and the float 7 returns to the position indicated in FIG. 3. As the float moves towards the seat 20, the south pole of the pole magnet 8 moves back in between the north poles of the valve magnets 12, 13, but as the valve magnets 12, 13 are now further away from the pole magnet (than illustrated in FIG. 5), the attractive force between the pole magnet south pole and the flap valve north poles is insufficient to overcome the fluid pressure behind the flap valves 10, 11 and hence the flap valves remain closed. This is an important feature of embodiments of the invention, as by virtue of this arrangement the control device does not cycle between open and closed positions.

To reset the device a user need only shut off the taps of the appliance and wait for a short period of time whilst the fluid pressures above and below the flap valves 10, 11 equalise. As the fluid pressures begin to equalise, the flap valves begin to pivot about their respective axes 16, 17 (initially under gravity, and then under an attractive force between the pole magnet south/north poles and the valve magnets' north/south poles) until the flap valves are at the position indicated in FIG. 4 and the hot and cold supplies are open once more. The user, if they so desire, can then reopen the taps to allow fluid to flow into the appliance once more.

It is apparent from the foregoing, that the device of this embodiment provides an effective means to control fluid flow that is capable of operating to substantially shut-off fluid supply without requiring an electrical supply. It is also apparent that the device of this embodiment, once activated to substantially shut-off fluid supply, remains in that activated state until reset.

In the foregoing embodiment, the device is configured for use with an appliance that has two discrete taps. It will be appreciated, however that the device could equally be used with a so-called mixer tap whereby hot and cold supplies are mixed in the mixer tap and passed to a single tap outlet. It will also be appreciated that the teachings of the present invention, as exemplified in the foregoing embodiment, may equally well be applied to applications where there is usually only a single fluid supply (such as for example a cold water tank).

Figure 7:
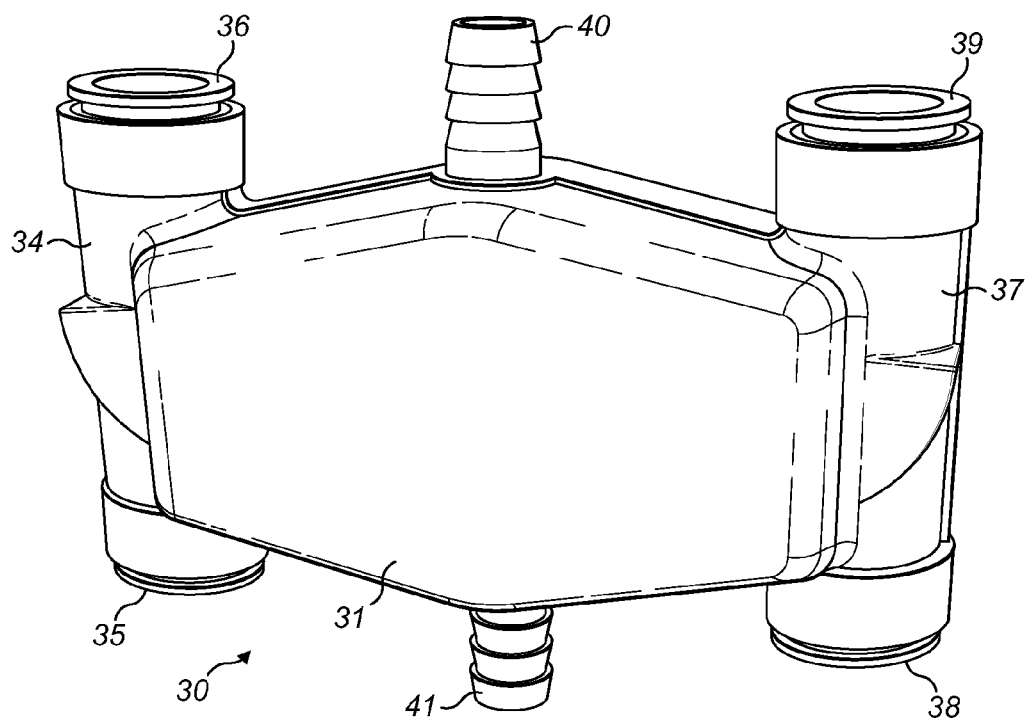
FIG. 7 is a schematic elevation of a control device according to a second preferred embodiment of the invention.

FIG. 7 is a schematic representation of a device 30 according to a second embodiment of the present invention.

Figure 8:
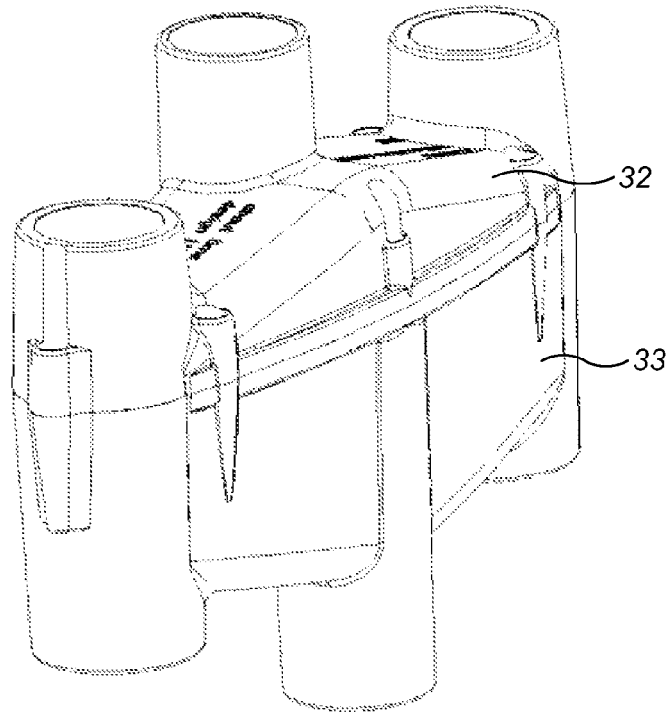
FIG. 8 is a perspective view of similar device to that illustrated in FIG. 7 showing alternative couplings.

The device of this embodiment comprises a moulded body 31 formed in two sections (as shown in FIG. 8), namely a top section 32 and a bottom section 33, with a gasket seal (not shown) therebetween. The top and bottom sections may be fastened together (with the seal in between) by screws, rivets, or may be permanently joined—for example by ultrasonic welding. For proper operation of the device it is important that it is orientated as shown in FIGS. 7 and 8 with the top section 32 uppermost.

The device of this embodiment is configured for use with appliances that provide both hot and cold fluid flows, and to this end comprises a hot fluid flow channel 34 having an inlet 35 and an outlet 36, and a cold fluid channel 37 having an inlet 38 and an outlet 39. The device includes an overflow inlet 40 and an overflow outlet 41, and as with the previous embodiment the overflow inlet is coupled to the appliance overflow and the overflow outlet is coupled to a drain (not shown), either by coupling the outlet to a waste pipe from the appliance or directly to a drain.

In FIG. 7, the device is configured for push-fit coupling of overflow piping (such as conventional rubber or braided hose) to the overflow inlet and outlet, whereas the device of FIG. 8 is provided with larger couplings for conventional pipework couplings of the type well known to persons skilled in the art of plumbing.

Of particular note is that the device depicted in FIGS. 7 and 8 is relatively thin, and as such is well suited for fitting behind a bath or basin where space may be somewhat limited.

Figure 9:
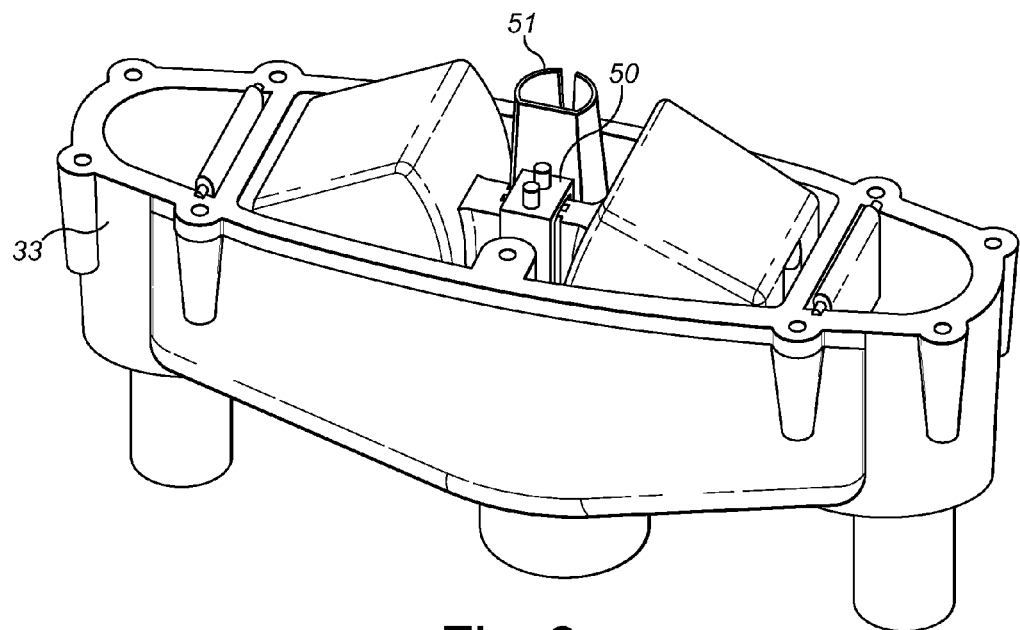
FIGS. 9 and 10 are perspective and plan views of part of the device depicted in FIG. 7.
Figure 10:
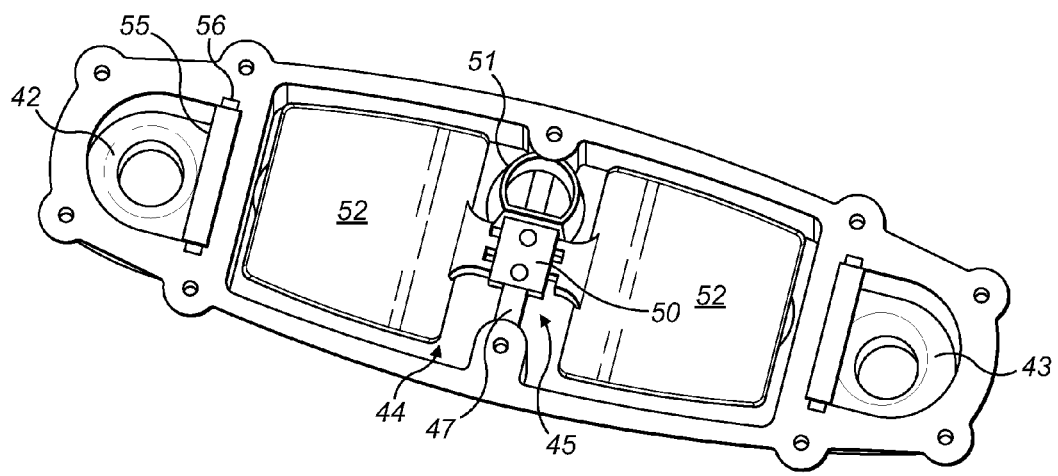

Referring now to FIGS. 9 and 10, the lower section 33 is internally divided into three sections: a first section 42 which forms part of the hot fluid flow channel 34, a second section 43 which forms part of the cold fluid flow channel 37, and a third section 44 between the first and second sections.

Figure 15:
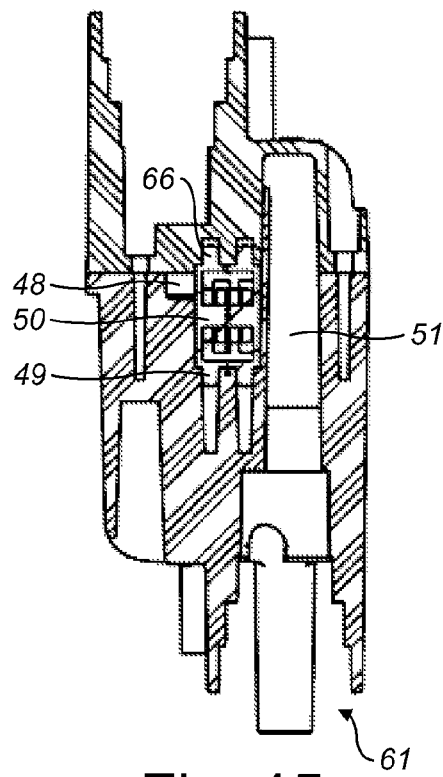
Figure 16:
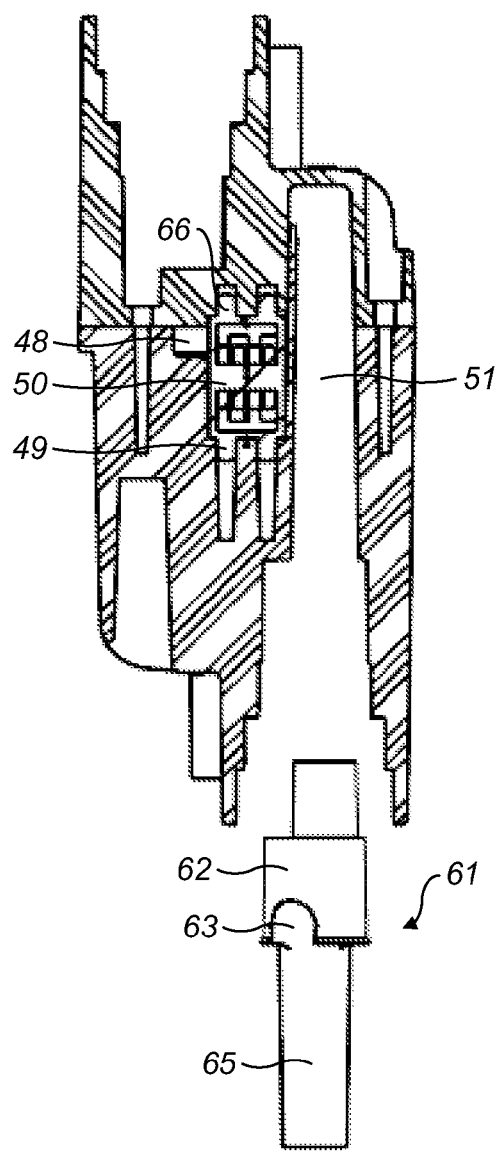
FIG. 16 is a schematic cross-sectional view of the device, as shown in FIG. 15, except with the gunge plug removed.

The third section 44 defines a void that is sub-divided by an internal wall 45 into two parts 44*a* and 44*b* that are in fluid communication with one another via a first channel 46 (best shown in FIG. 13) located towards the overflow outlet 41, and a second aperture towards the waste inlet 40 formed by a stepped wall section 47 (best shown in FIGS. 15 and 16). The internal wall includes a mounting point 49 (FIGS. 15 & 16) for a hinge mounting 50 and a channel 51 (that is in this instance generally D-shaped) running upwards from the waste outlet 41 towards the top section 32 of the device.

Within each part 44*a*, 44*b* of the third section 44, there is provided an actuator, in this instance a generally kidney-shaped hollow float 52 that is mounted to the hinge mounting 50 so as to be able to pivot with respect thereto. Each float carries a generally horizontally mounted magnet 53 (best shown in FIGS. 18 and 19) orientated with the north pole uppermost.

Figure 18:
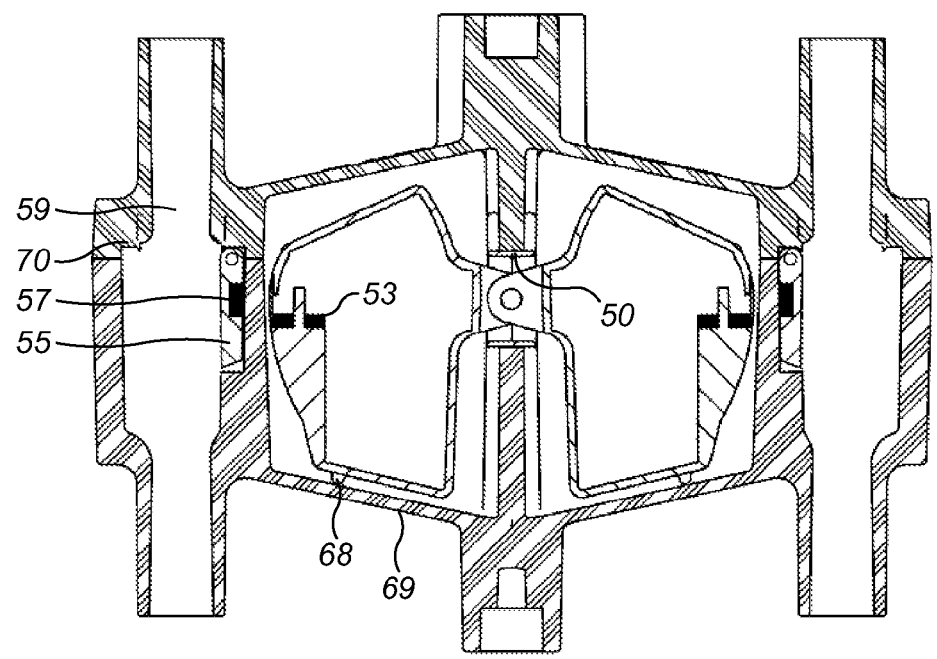
FIG. 18 is a schematic cross-sectional view along line 18-18 of FIG. 17 showing the device in a dormant state.
Figure 19:
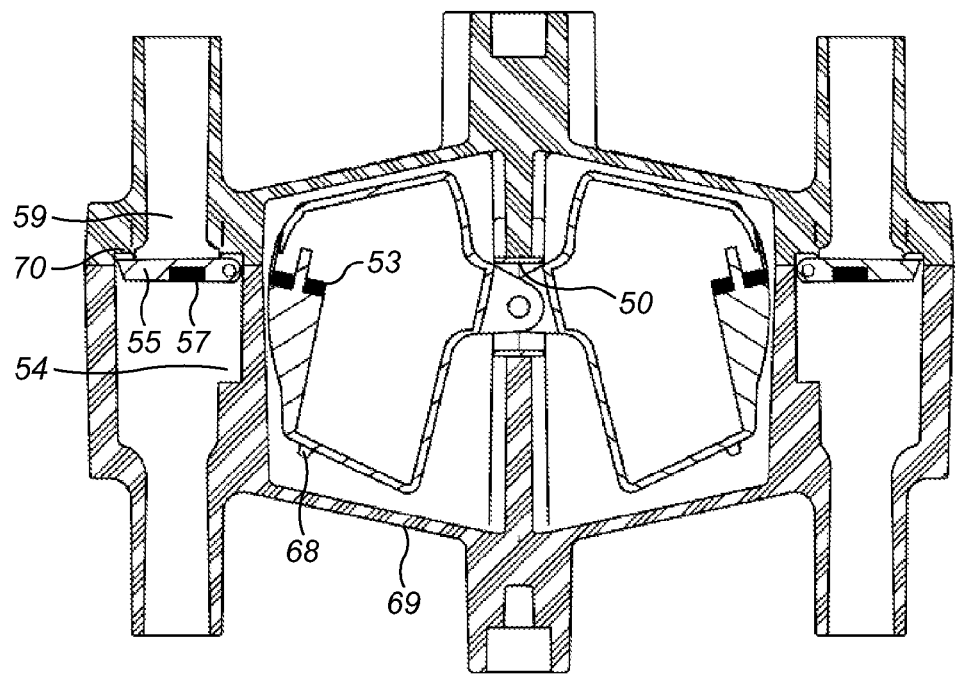
FIG. 19 is a schematic cross-sectional view of the device, as shown in FIG. 18, except showing the device in an activated state.

The first and second sections 42, 43 each include a recess 54 (best shown in FIG. 19) in which a generally D shaped flap valve 55 is suspended by locating spigots 56 at the ends of each valve in slots (not shown) formed in the recess. As shown in FIGS. 18 and 19, each flap valve 55 includes a magnet 57 that is secured (e.g. by glue) in a recess in a surface of the valve which abuts the wall between the first and third, and second and third sections—respectively—of the lower section 33. The flap valve magnets are orientated such that their south poles point towards the central hinge 50 (although it will be appreciated that the orientation of the float magnets and valve magnets may be reversed without affecting the way in which the device operates).

An important feature of this embodiment is that by locating the flap valves 55 in recesses 54 in the first and second sections, the valves do not impinge on the hot and cold fluid channels 34, 37 until the device is activated.

Figure 11:
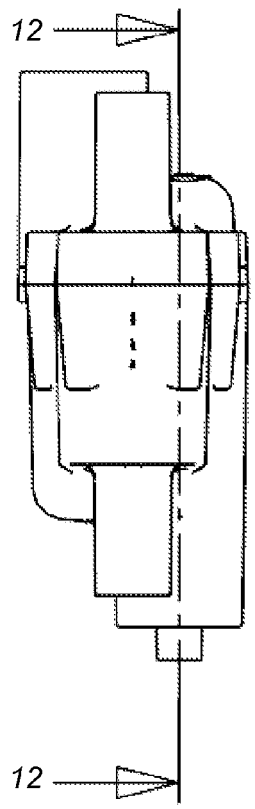
FIGS. 11 and 12 are, respectively, a schematic side view of the device and a cross-sectional view along the line 12-12 with a gunge plug inserted.
Figure 12:
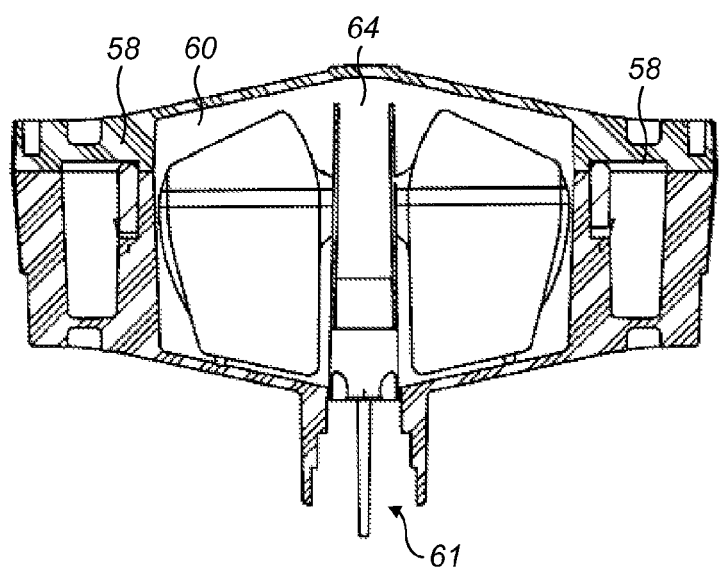

Referring now to FIGS. 11 and 12, the top section 32 includes lateral flange portions 58 which close the first and second sections 42, 43, and each flange portion includes an aperture 59 (see FIGS. 18 and 19) to permit fluid flow from the first and second sections out of the hot and cold outlets 36, 39. The top section 32 is of reduced wall thickness between the aforementioned flanges so as to define a depression 60 that communicates with the void of the third section 44, and into which the floats 52 can move when the device activates.

Figure 13:
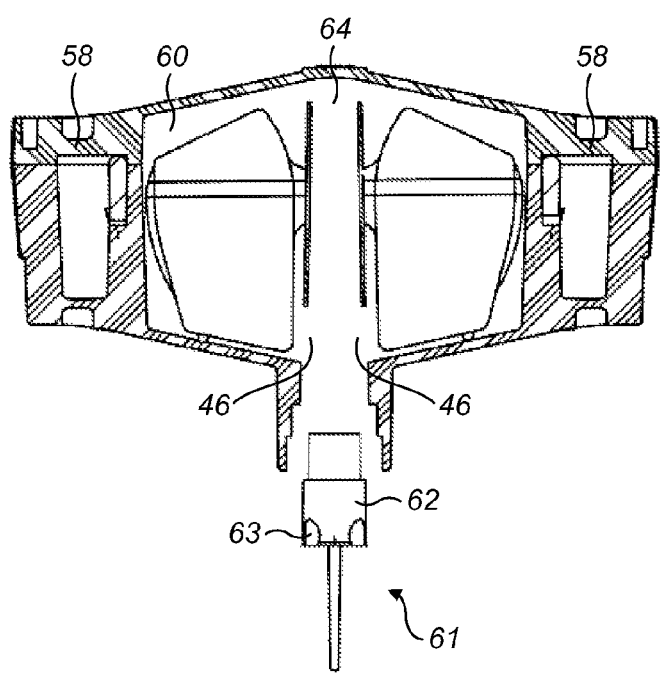
FIG. 13 is a schematic cross-sectional view of the device, as shown in FIG. 12, except with the gunge plug removed.

As aforementioned, and as shown in FIG. 13, the first and second parts 44a, 44b of the third section void are in communication via a channel 46 that is shown in FIG. 12 as being partly closed by a gunge plug 61.

The gunge plug functions, in the event of an oversupply occurring, to ensure that the volume of fluid leaving the device via the overflow outlet 41 (per unit time) is less than the volume of fluid entering the device via the overflow inlet 40—thereby ensuring that the void defined by the third section 44 fills with fluid. To this end the gunge plug includes a central through-hole (not shown) defined by a peripheral wall 62 which substantially closes the channel 46 and which includes a plurality of cut-away wall sections 63 which permit a limited draining of fluid from the third section void to the drain.

The gunge plug central bore is in communication with the aforementioned D-shaped channel 51 formed in the internal wall 45, and as shown in FIGS. 12 and 13, there is a gap 64 between the top section 32 and the D-shaped channel 51 so that fluid can drain from the third compartment void (when it has reached a sufficient level) by flowing over the top of the wall defining the D-shaped channel 51, down the channel 51, through the central through-hole of the gunge plug 61 and from there out of the overflow outlet 41 to the drain.

The gunge plug 61 includes a handle 65 so that it can be removed from the device (as shown in FIG. 13) to allow a user to clear at least part of the third section voids 44a, 44b of any detritus (gunge) that might accumulate in the device in use, and which may otherwise impair proper operation of the device by blocking the aforementioned cut-away wall sections 63.

Figure 14:
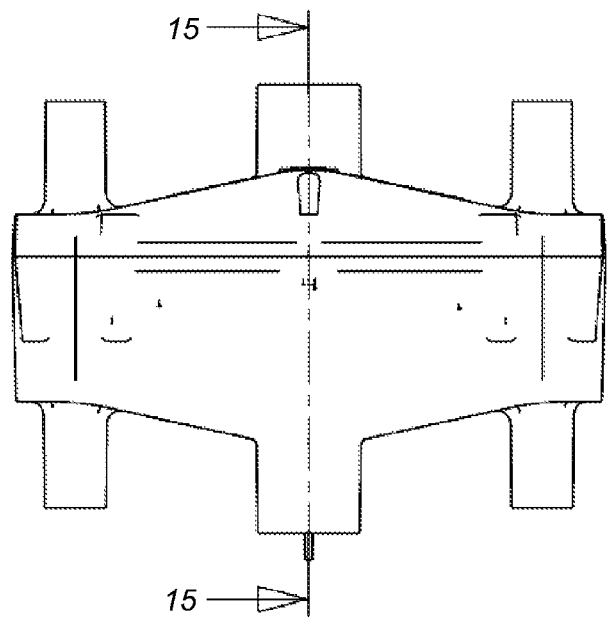
FIGS. 14 and 15 are, respectively, a schematic elevation of the device and a cross-sectional view along the line 15-15 with the gunge plug inserted.

Referring now to FIGS. 14 to 16, the top section 32 includes a complementary mounting point 66 for the aforementioned hinge mounting 50, and the top and bottom section mounting points ensure that the hinge mounting 50 is secured and does not move when the top and bottom sections are fixed together. The top and bottom section mounting points may simply comprise depressions with which projections 67 (FIG. 10) on the top and bottom of the hinge mounting can mate.

The hinge mounting itself comprises a peripheral wall defining a generally rectangular frame having a pair of spaced parallel short sides, and a pair of spaced parallel long sides. The short sides of the frame are provided with the aforementioned projections, and the long sides are joined by an axle to which the floats 52 can be clipped for pivotal movement with respect to the frame.

As shown in FIGS. 15 and 16, if the device is configured as shown in FIG. 8, then it is preferred for the waste inlet and outlet (and indeed for the cold and hot inlets and outlets) to have a stepped cross-sectional shape to permit coupling of the device to a variety of different pipe diameters. This should not be interpreted as being an essential feature of the invention, however, as many different couplings are known to persons skilled in the art of plumbing—any one or more of which may be used.

Figure 17:
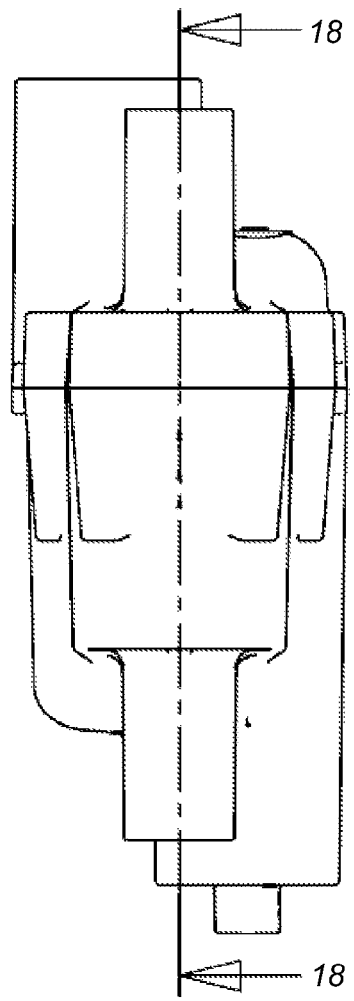
FIG. 17 is a schematic side elevation of the device showing cross-section 18-18.

Referring now to FIGS. 17 to 19, operation of the device will now be described in detail.

In its dormant state, as depicted in FIG. 18, protrusions 68 formed on the base of each of the floats 52 bear against a bottom wall 69 of the third section 44, and each of the flap valves 55 lie in their respective recesses 54 so that they do not impede fluid flow through the hot and cold channels 34, 37.

If the taps of the appliance (not shown) should be left on for a sufficient period of time, the fluid flowing into the appliance will eventually reach a point where it flows into the appliance overflow and from there into the void defined by the third section 44 via the overflow inlet 40. With the gunge plug 61 in place, the rate of fluid ingress to the third section void will be greater than the rate of fluid egress and the void will fill with fluid.

As the void fills with fluid the floats 52 rise and the float magnets 53 move from a rest position where their north poles are adjacent the south poles of the valve magnets 47 and exert an attractive force thereon, across the face of the valve magnet south poles. As the float magnets move across the face of the valve magnets, a point is reached where the south faces of the float and valve magnets interact, and at this point the valve magnets are repelled by the float magnets to cause the flap valves to move to close (aided by the fluid pressure) the hot and cold channels 34, 37 (as depicted in FIG. 19).

As before, in the preferred arrangement the device is constructed to continue to permit a modicum of fluid flow past the flap valves when the valves are in the closed position, and this may be accomplished by perforating the flap valves, or by providing that the flap valves do not completely seal against valve seats 70 formed in the top section flanges 58. As before it is preferred that closing the valves reduces the rate of fluid flow by at least 70% and preferably more than 80%.

Once the rate of fluid flow into the appliance is reduced by virtue of the supplies being substantially closed, the rate of fluid egress from the void will be larger than the rate of fluid ingress, and the void will begin to empty via the cut-away wall sections 63 of the gunge plug 61. As the void begins to empty the floats 52 move back towards their at rest position depicted in FIG. 18, but the valve flaps 55 remain in their closed position and continue to substantially restrict fluid flow through the hot and cold supply channels 34, 37.

When the user of the appliance notices that an oversupply condition has occurred, the user must turn off the taps of the appliance to allow the device to automatically reset. When the taps are turned off, the fluid pressures above and below the flap valves begin to equalise and the flap valves move back towards their respective recesses—at first under the influence of gravity and later additionally under the influence of an attractive force between the float and flap magnets.

This resetting process typically takes less than 30 seconds, and once completed the device has automatically reset and the user can again turn on the taps to allow fluid to flow into the appliance (although they should first ensure that some fluid has been let out of the appliance before starting to refill it).

Whilst the foregoing presents the currently preferred embodiment of the present invention, it will be apparent to persons skilled in the art that a variety of different arrangements may instead be proposed without departing from the scope of the invention.

Figure 20:
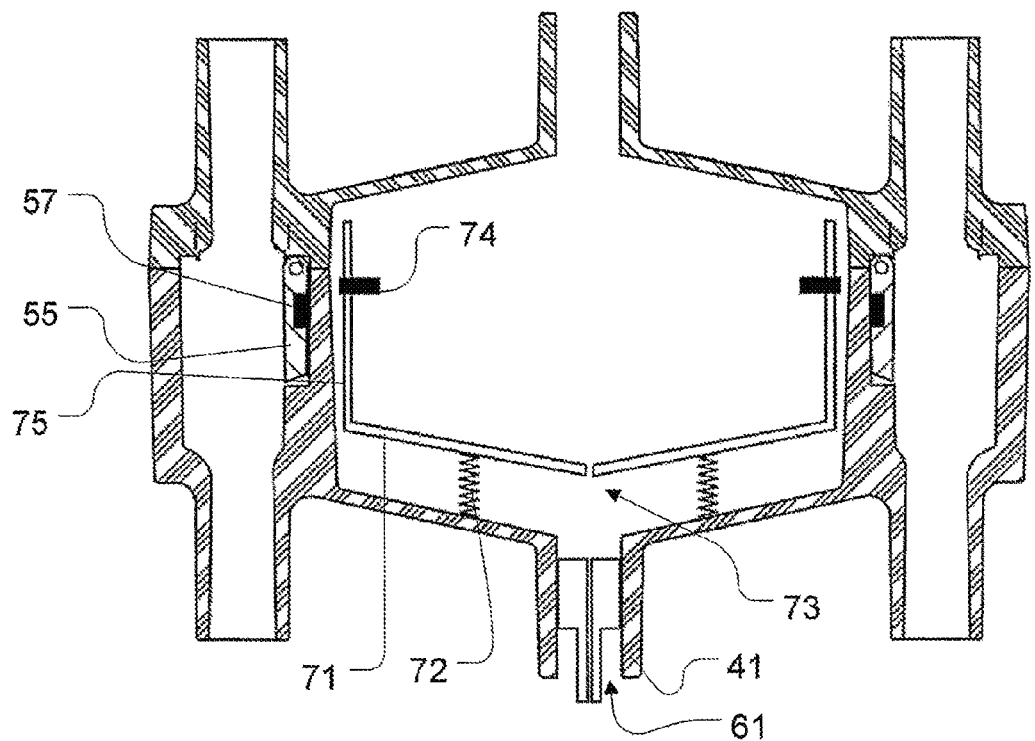
FIG. 20 is a schematic cross-sectional view of a device according to a third embodiment of the invention in a dormant state.
Figure 21:
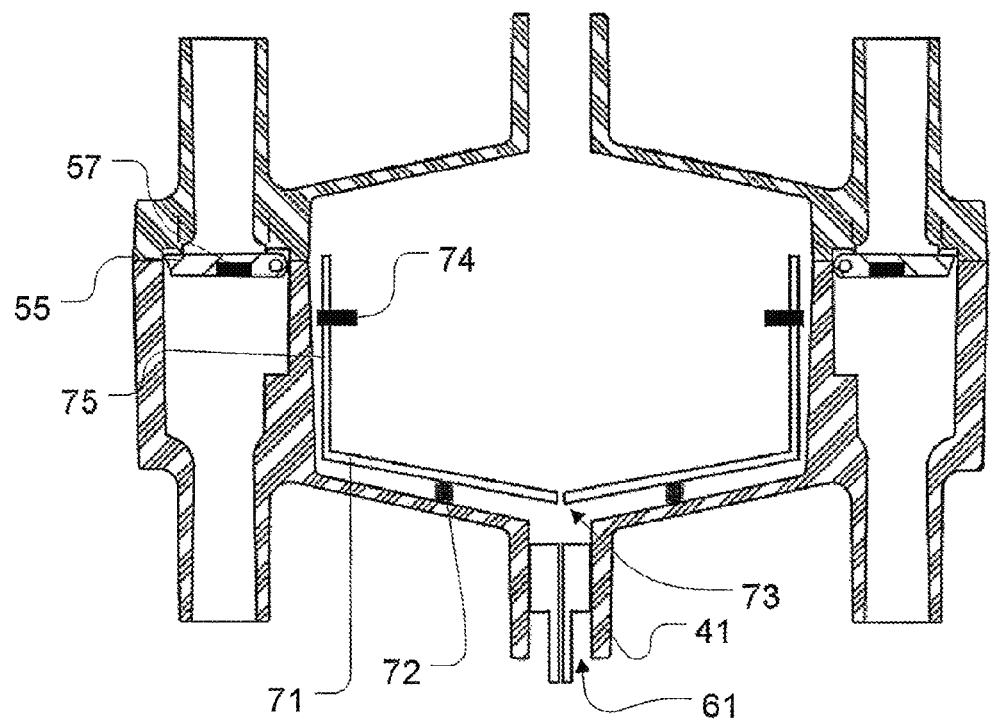
FIG. 21 is a schematic cross-sectional view of the device shown in FIG. 20 in an activated state.

One such arrangement, a third embodiment of the present invention, is shown in cross-section in FIGS. 20 and 21 of the accompanying drawings. This embodiment will now be described using the reference numerals used earlier to describe the second embodiment, where it is appropriate to do so.

In this embodiment of the invention, the actuator for the device comprises a hollow receptacle 71 that is arranged within the void defined by the aforementioned third section 44. The receptacle is mounted on a plurality of resilient mountings 72, for example helical springs, and the mountings 72 bear on the floor 69 of the third section to allow the receptacle to move upwards and downwards with respect to the floor 69.

The receptacle includes a drain 73 which is sized so that the rate of fluid flow out of the receptacle is less than the rate of fluid flow into the device. As before, the outlet may be plugged by a removable gunge plug 61, although in this instance as control of the rate of fluid egress is accomplished by means of the receptacle drain 73, there is no need for the plug to include cut-away wall sections.

The receptacle includes a pair of magnets 74 orientated as shown, fixed to lateral sidewalls 75 of the receptacle proximate the flap valves 55. If the flap valve magnets 57 are orientated with south poles pointing towards the third section void, then the magnets fixed to the lateral receptacle walls should be orientated with north poles facing towards the overflow outlet 41. Again as with the second embodiment, the orientation of the valve and receptacle magnets may be reversed if desired so that the flap valve magnet north poles point towards the receptacle 71 and the receptacle magnet south poles point towards the overflow outlet 41

In the rest position, the resilient mountings 72 are extended, the receptacle magnets 74 are located vertically above the flap valve magnets 57, the receptacle is empty, and the flap valves are open. In the event of an oversupply, fluid enters the receptacle at a faster rate than it leaves, and the receptacle begins to fill with fluid. As the receptacle fills the receptacle gets heavier and moves downwards against the bias of the resilient mountings. As the receptacle magnets track across the face of the flap magnets, the valves operate to close the fluid supplies until the device is reset by turning off the taps of the appliance to allow the fluid pressure above and below the flap valves to equalise, as before.

Figure 22:
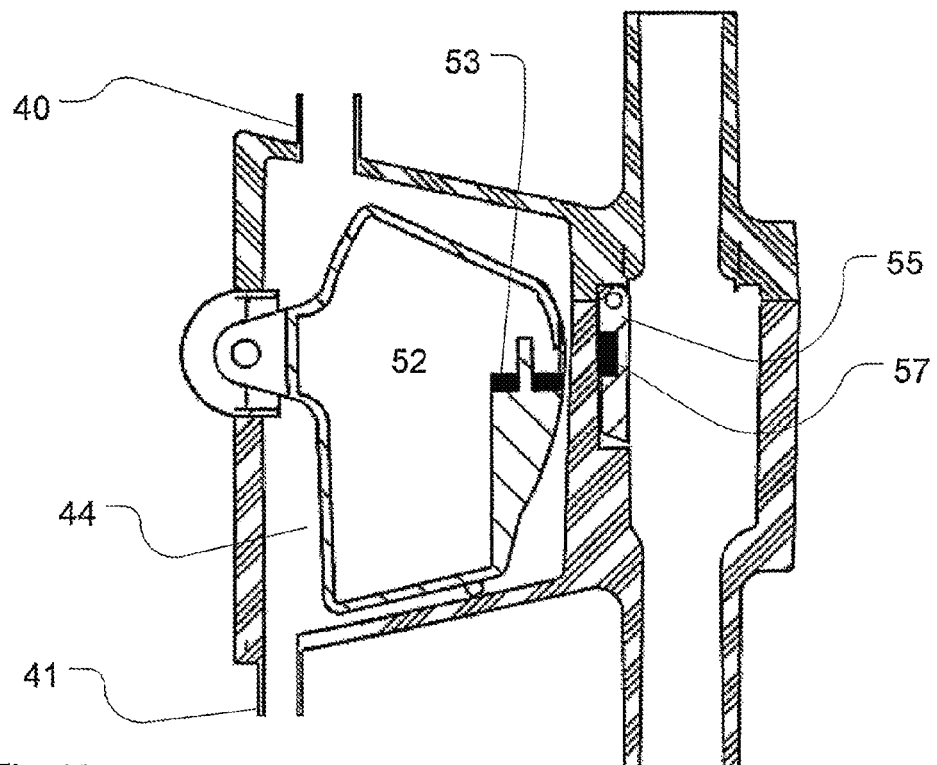
FIG. 22 is a schematic cross-sectional view of a device according to a fourth embodiment of the invention in a dormant state.
Figure 23:
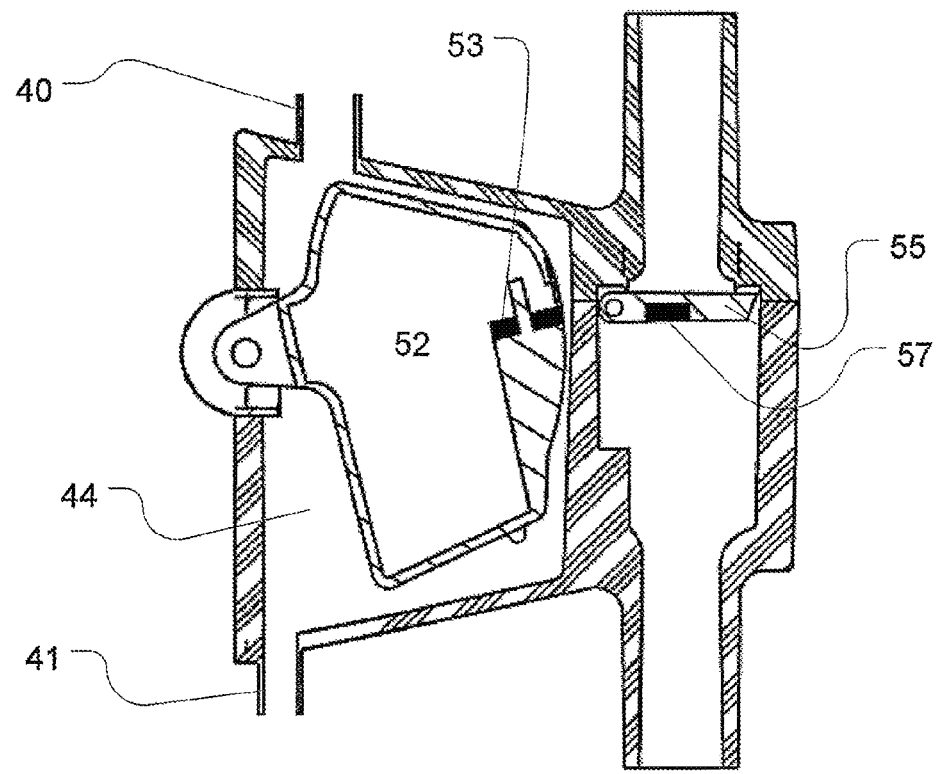
FIG. 23 is a schematic cross-sectional view of the device shown in FIG. 22 in an activated state.

FIGS. 22 and 23 illustrate in cross-section, a fourth embodiment of the present invention which operates in exactly the same manner as the device of the second embodiment. As before, the same reference numerals have been used to describe this embodiment as that of the second embodiment wherever it is appropriate to do so.

The device of this fourth embodiment is configured for the control of a single fluid supply, and is particularly well suited for control of fluid supply to a water tank (such as a tank for a domestic heating system). The device comprises only a single actuator, in this case a float 52. As with the second embodiment, the float 52 carries a magnet 53 which interacts with a magnet 57 carried by a flap valve 55 to move the valve 55 to close a fluid supply channel when an oversupply condition occurs and fluid runs into an overflow inlet of the device.

Although not shown in FIGS. 22 and 23, the device includes a gunge plug of similar construction to that of the second embodiment, which plug is insertable into the overflow outlet 41 to ensure that the rate of fluid egress from the device is less than the rate of fluid ingress via the overflow inlet 40, and hence to ensure that the void 44 within the device fills with fluid when an oversupply condition occurs.

Figure 24:
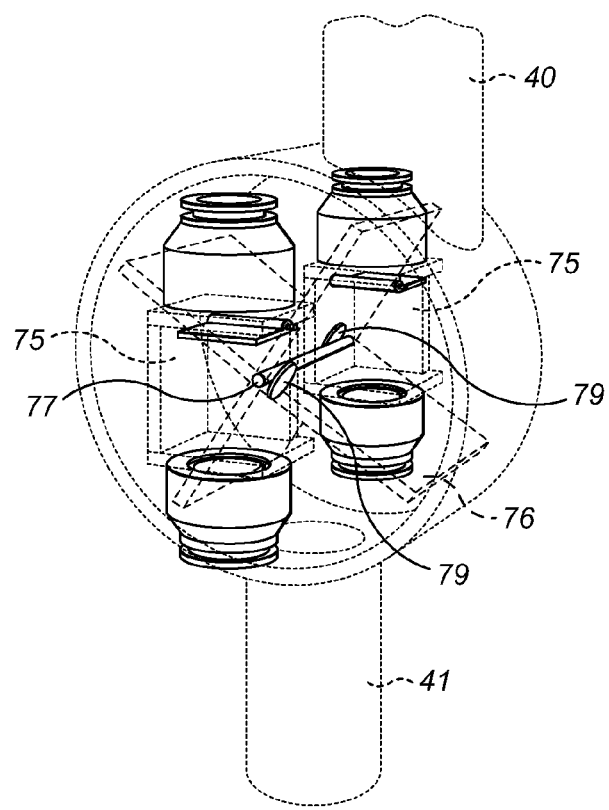
FIG. 24 is a schematic perspective view, partly in ghost, of a control device according to a fifth embodiment of the present invention.
Figure 26:
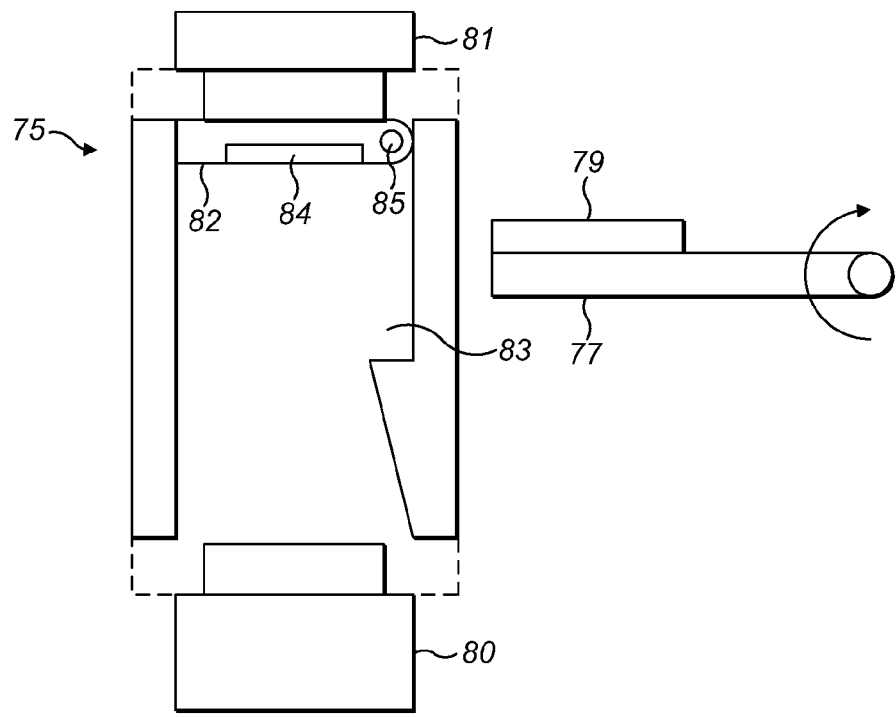

FIG. 24 illustrates a fifth embodiment of the present invention, and FIGS. 26 and 27 illustrate particular components of that embodiment in open and closed configurations, respectively.

Referring to FIG. 24, the device of this embodiment comprises a pair of valve assemblies 75 (that will each be described in great detail in connection with FIGS. 26 and 27), and an actuator which includes an overflow inlet 40, an overflow outlet 41 and a generally X-shaped bladed member 76 that is rotatable about a central axle 77 of a cylindrical housing 78. As shown in FIG. 24, a first valve assembly is in front of the cylindrical housing, and a second is behind the housing.

At each end of the axle 77, proximate each of the valve assemblies 75, there is provided a magnet 79 and the magnets are orientated such that they lie in a plane orthogonal to the plane in which the valve assembly magnets lie.

Figure 25:
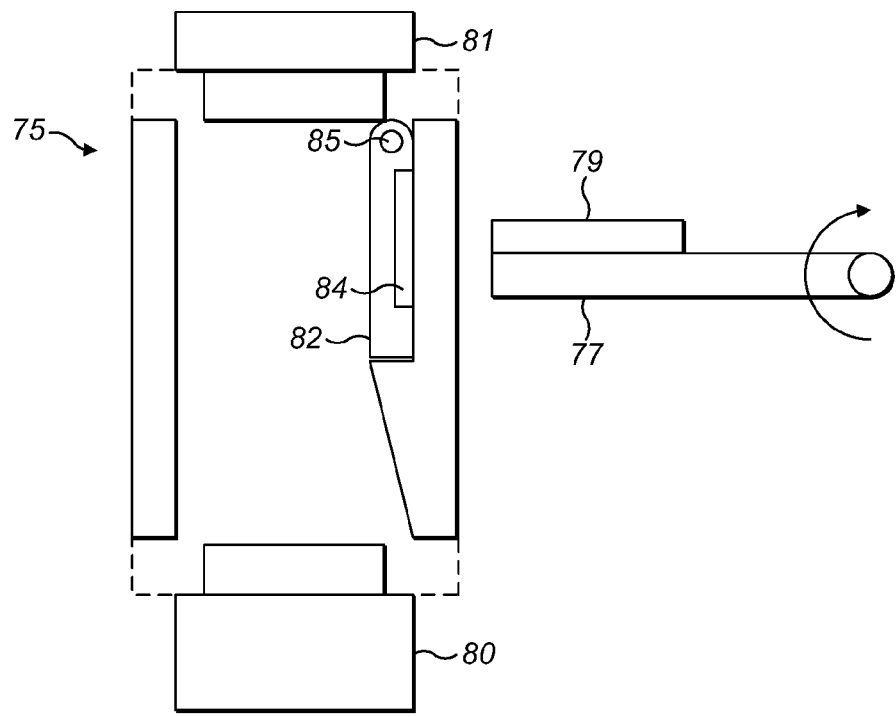
FIGS. 25 and 26 are schematic perspective views of a valve chamber for use with the fifth embodiment in open and closed configurations.

Referring now to FIGS. 25 and 26, each valve assembly 75 comprises a housing with a fluid inlet 80, a fluid outlet 81, and a flap valve 82 accommodated in a recess 83 in a wall of the housing. The flap valve is pivotable about an axis 84 from an open position illustrated in FIG. 25 to a closed position illustrated in FIG. 26 where fluid flow from the outlet is at least substantially prevented.

The flap valve carries a magnet 84 orientated to lie in a plane orthogonal to that in which the magnet 79 attached to the axle 77 lies, and on rotation of the axle 77 a repulsive force is generated between the axle magnet 79 and the valve magnet 84 which causes the valve magnet 84 to pivot about axis 85 and move to close the valve outlet 81. As before, the valve assembly of this embodiment remains closed until the device is reset, for example by turning off a tap to which the valve assembly is connected to allow the fluid pressure above and flow the flap valve to equalise and the flap to return to the at rest position indicated in FIG. 25.

In use, a fluid entering the overflow of the appliance to which the device is connected flows into the overflow inlet and hits a blade of the X-shaped bladed member 76. Impact of the fluid on the bladed member 76 causes the bladed member to rotate, whereupon the magnets repel and the flap valve operates to close the fluid outlet 81.

It is apparent from the foregoing that the various embodiments of the invention described herein do indeed provide a means for controlling fluid flow that does not cycle, and which does not require an electrical supply.

It will also be apparent that whilst certain presently preferred embodiments of the present invention have been described herein it should be noted that those embodiments are described by way of example only, and that modifications and alterations may be made to the particular embodiments described herein without departing from the scope of the invention defined by the claims. For example, when the fluid to be transported comprises a gas it may be necessary or expedient to reset the device by providing a short blast of gas into the fluid outlet 36, 81 to cause the valve to move from its activated position to its rest position. A fluid feed tube (and optionally a relatively high pressure gas supply, such as a gas bottle for example) may be provided for this purpose. In another modification, the receptacle could—instead of being resiliently biased from the floor of the chamber—be suspended by resilient biasing means from a ceiling of the chamber. The receptacle of the third embodiment could alternatively carry only a single magnet (or alternatively act only on a single valve) and hence be configured, like the device of the fourth embodiment, for the control of a single fluid supply.

What is claimed is:

1. An automatic fluid flow control device for a fluid supply, wherein the device is operable without an electrical supply, and comprises:

an actuator housing having a plurality of walls that cooperate to define an internal actuator void, said actuator housing having an inlet through which an oversupply of fluid can flow into said void and an outlet through which fluid can flow from said internal void to a drain;

an actuator comprising a first magnet, said actuator being located in said void and being movable by an oversupply of fluid flowing into said void via said inlet between a first position corresponding to a normal fluid supply and a second position corresponding to a fluid oversupply;

a valve housing provided in said fluid supply and arranged so that fluid in said supply can flow through said valve housing; and a valve pivotally mounted in said valve housing for movement between an open position where fluid can flow through said valve housing and a closed position where fluid flow through said valve housing is at least substantially shut-off, said valve comprising a second magnet;

wherein the actuator and valve are configured and arranged so that said first magnet exerts a magnetic force through a said wall of said actuator housing on the second magnet as the actuator moves from said first position towards said second position, the magnetic force causing said valve to move from said open position towards said closed position, whereupon fluid flowing through said valve housing urges said valve to said closed position, whereupon fluid pressure holds said valve in said closed position whilst the actuator returns to said first position and until the device is reset.

2. A control device according to claim 1, wherein said magnets are arranged in said first position with different magnetic poles adjacent, and in said second position with like magnetic poles adjacent.

3. A control device according to claim 1, wherein the actuator comprises a float.

4. A control device according to claim 1, wherein the outlet is configured to be capable of passing a smaller volume of fluid per unit time than the inlet.

5. A control device according to claim 4, comprising a stopper for the outlet which stopper reduces the volume of liquid that can flow through said outlet per unit time.

6. A control device according to claim 5, wherein the stopper is removable from the outlet.

7. A control device according to claim 5, wherein the stopper includes a plurality of cut-away wall portions to permit fluid flow therethrough.

8. A control device according to claim 3, wherein the float is pivotable between said first and second positions.

9. A control device according to claim 1, wherein the actuator comprises a second magnet, the actuator being configured and arranged to exert, as the actuator moves from said first position towards said second position, a magnetic force through a said wall of said actuator housing on a valve magnet carried by a second valve in a second valve housing that is coupled to a second fluid supply.

* * * * *